(12) United States Patent
Goloshubin et al.

(10) Patent No.: US 7,055,108 B2
(45) Date of Patent: May 30, 2006

(54) DIRECTIONAL FOCUS MANAGER

(75) Inventors: Alexey Goloshubin, Bergen (NO); Bjarne Geir Herland, Bergen (NO)

(73) Assignee: Wind River Systems, Inc., Alameda, CA (US)

( * ) Notice: Subject to any disclaimer, the term of this patent is extended or adjusted under 35 U.S.C. 154(b) by 669 days.

(21) Appl. No.: 10/192,970

(22) Filed: Jul. 11, 2002

(65) Prior Publication Data

US 2003/0014401 A1 Jan. 16, 2003

Related U.S. Application Data

(60) Provisional application No. 60/305,054, filed on Jul. 13, 2001.

(51) Int. Cl.
*G06F 13/00* (2006.01)

(52) U.S. Cl. ....................... 715/853; 715/854
(58) Field of Classification Search ................ 715/853, 715/855, 854, 765, 763
See application file for complete search history.

(56) References Cited

U.S. PATENT DOCUMENTS

| | | | |
|---|---|---|---|
| 6,049,326 A | 4/2000 | Beyda et al. | |
| 6,088,032 A | 7/2000 | Mackinlay | |
| 6,091,417 A | 7/2000 | Lefkowitz | |
| 6,243,093 B1 | 6/2001 | Czerwinski et al. | |
| 6,297,824 B1 | 10/2001 | Hearst et al. | |
| 6,396,509 B1 | 5/2002 | Cheng | |
| 6,404,446 B1 * | 6/2002 | Bates et al. | 715/854 |
| 6,701,314 B1 * | 3/2004 | Conover et al. | 707/7 |
| 6,826,727 B1 * | 11/2004 | Mohr et al. | 715/517 |

* cited by examiner

*Primary Examiner*—Cao (Kevin) Nguyen
(74) *Attorney, Agent, or Firm*—Davidson, Davidson & Kappel LLC (57) ABSTRACT

A method for navigating a web page with directional keys is provided where the page is scanned for a next closest element along a predetermined search path in the direction of a selected arrow key. In this regard, the search path can be defined as a tunnel or a cone. If the next closest element is not found, the search path is enlarged by a certain increment and scanning is repeated. This process repeats until a next closest element is found. If a next closest element does not exist in the direction of the selected arrow key, scanning will wrap around the page and continue to the opposite side of the page in the direction of the originally selected arrow key.

51 Claims, 9 Drawing Sheets

DIRECTIONAL FOCUS MANAGER

This application claims priority from U.S. Provisional Application Ser. No. 60/305,054, filed Jul. 13, 2001, the entire disclosure of which is hereby incorporated by reference.

BACKGROUND OF THE INVENTION

Typical computer interfaces include a monitor that displays a number of graphical user interfaces (GUIs) which are graphical representations of executable computer programs. The graphical representations include elements such as buttons, boxes and lines of text. A point and click device, such as a mouse, is moved by a user on a surface, such as a desktop, causing a corresponding pointer on the computer display to move. To select a graphical representation in the GUI, also referred to as icons, the user moves the pointer over the desired item and presses a button on the mouse, known as clicking on the icon.

When a user clicks on an icon, it creates an input command to the computer to execute certain code, which may include opening an application, opening a file, or running a program. For example, a word processor application will have a corresponding icon on the computer display that, when clicked, will start the application. The computer translates the clicking action to a run command in the following way. When the user clicks on the word processor icon, the computer checks an icon file that contains the defining properties of the icon, including the particular input command that corresponds to the action of clicking on the icon.

After accessing the icon file, the computer executes the particular input command, which opens the application, or starts the program. If an icon represented a picture file, for example, clicking on that icon would cause the computer to display the picture. Clicking on a "print" icon would print out the picture.

Most computer systems operate through some type of GUI, making a point and click device essential and navigation without one very difficult. This is especially true with the World Wide Web (the Web) which seeks to allow simple and intuitive navigation of Internet sites through GUIs. The Web has become the leading information retrieval service of the Internet (a worldwide computer network). Users access information on a web site through its web pages. Each page is a GUI with a number of clickable elements (electronic links) that lead to other web pages, file downloads, or other web sites.

SUMMARY OF THE INVENTION

In accordance with a first embodiment of the present invention, a method for navigating a GUI web page in a browser is provided which includes the steps of selecting a focus element, determining a search direction, defining a search tunnel in the search direction starting at the focus element, scanning the search tunnel for a next closest GUI element to the focus element, and transferring focus to the next closest element.

In accordance with a second embodiment of the present invention, a method for navigating a GUI web page in a browser is provided which includes the steps of selecting a focus element, determining a search direction, and defining a search cone in the search direction starting at a midpoint of the focus element. In this regard, the search cone is defined by a pair of lines extending from the midpoint at a predetermined angle. The method scans the search cone for a next closest GUI element to the focus element, and transfers focus to the next closest element.

In accordance with a third embodiment of the present invention, a method for navigating a GUI web page in a browser is provided which comprises the steps of: (a) selecting a focus element; (b) determining a search direction; (c) defining a search line in the search direction starting at a midpoint of the focus element; (d) scanning the search line for a next closest GUI element to the focus element; and (e) if the next closest element is found, transferring focus to the next closest element. If the next closest element is not found in the search line, the method proceeds in step (f) to define a larger search path. In this regard, the larger search path comprises a cone defined by a pair of lines extending from the midpoint at a predetermined angle from the search line. The method then (g) scans the larger search path for the next closest element, (h) if the next closest element is found, transfers focus to the next closest element, and (i) if the next closest element is not found in the larger search path, increases the predetermined angle and repeat steps (f) through (i).

In accordance with other embodiments of the present invention, web browser navigation systems are provided which include a processor and a data storage device operably connected to the processor. The data storage device includes a program executable by the processor to perform the steps described above with regard to the first, second, and third embodiments.

In accordance with still other embodiments of the present invention, computer readable media are provided which have stored thereon computer executable process steps operable to control a processor to perform the steps described above with regard to the first, second, and third embodiments.

DETAILED DESCRIPTION OF THE PREFERRED EMBODIMENTS

In accordance with the present invention, web page navigation by directional arrow keys is provided in a web browser in a manner that does not require modification of web pages designed for implementation in a point-and-click GUI. A software module is provided that operates within a web browser so that when the browser receives a directional arrow keystroke, the module uses a multi-pass algorithm to search in the general direction of the selected arrow key for the element in the GU that is closest to the focus element, (e.g. the currently selected icon). After the closest element in the arrow key direction is located, focus is transferred to that element. In this way, web pages viewed with a browser according to the present invention can be navigated with directional arrow keys.

If the newly focused element is the one desired by the user, then the appropriate action may be taken by the user on the newly focused element. For example, the user may select the newly focused element with the enter key, which has the same effect as clicking on the element. If not, then the newly focused element is used as a step to get to the desired element and the appropriate arow directional key is selected to move to the next closest element in the direction of the desired GUI element.

Figure 1:
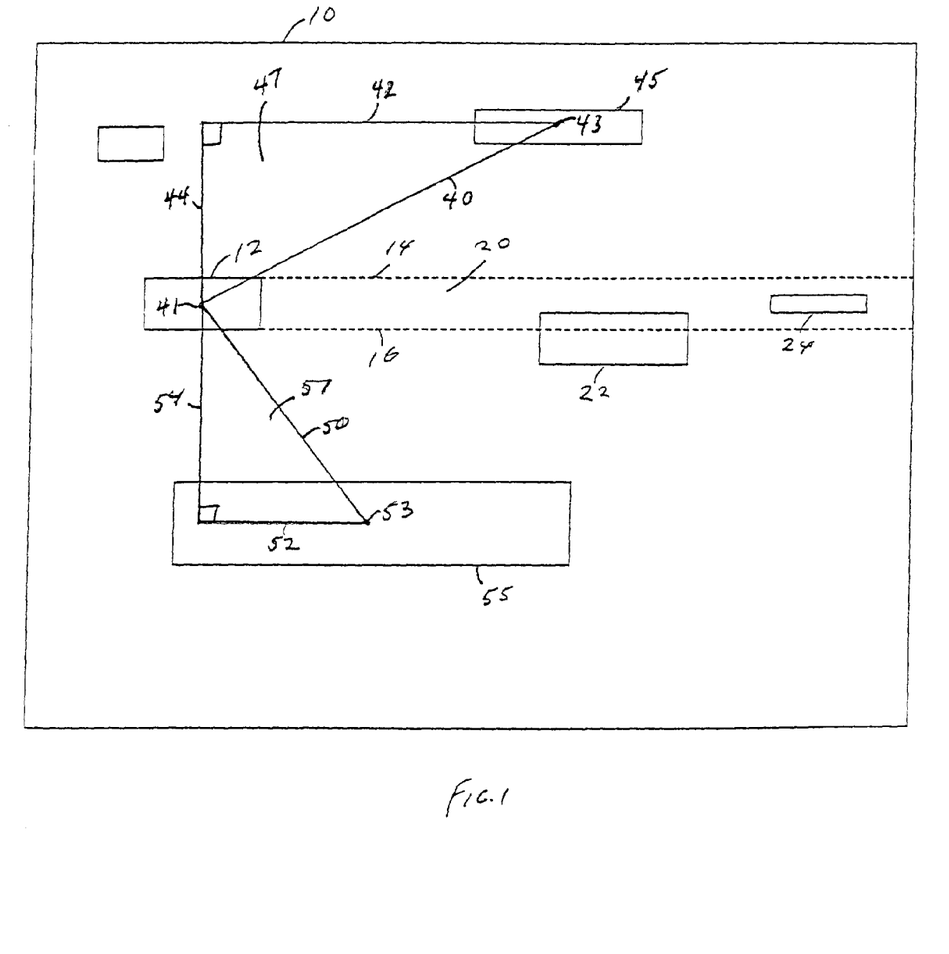
FIG. 1 depicts a GUI according to a first embodiment of the present invention.

FIG. 1 shows a GUI 10 implementing a first embodiment of the present invention. In FIG. 1, a user is attempting to shift focus to the right of the focus element 12 which could, for example, be a button element, a checkbox element, option element, text area element, a label element, or other selectable element. When the right directional arrow is selected on an input device, such as a keyboard (not shown), the browser scans the GUI 10 for an element within a tunnel 20 defined by the horizontal band extending to the right of the focus element 12 and between the top and bottom of the focus element 12 (as indicated by line 14 and line 16 ). In this example, the closest element within the tunnel 20 is element 22. Therefore, focus is transferred from element 12 to element 22. In this way, the application defines a tunnel extending in the direction of the selected arrow directional key having a width equal to the side of the focus element facing the scanned direction, i.e., the left/right sides of an element for the up/down keys and the top/bottom sides for the left/right arrow keys. It should be noted that the tunnel 20 is a two dimensional tunnel.

In this example, the closest element is defined as the one with the shortest distance between the center of the focus element and the center of the element in question, and distance is defined as the point to point distance between the center of the focus element and the element in question. Naturally, other points on the elements could be used as the reference point for the distance, provided that a consistent point is used each time a scan is made. In addition, the distance could alternatively be defined as the absolute distance between elements in the search direction (e.g. the distance along the x-axis for a left/right scan) rather than the point to point distance.

If there is no element in the tunnel 20, then the closest element in the arrow direction is selected so that any element located to the right of the focus element, regardless of vertical position, is selected. Assuming there were no element 22 or 24 in FIG. 1, the next closest element would be found as follows.

A search path is selected that originates at the midpoint 41 of the focus element 12 and extends from the right side of the element 12 to the right edge of the GUI, and from the top of the GUI to the bottom of the GUI. Upon scanning this search path, elements 45 and 55 are located. The midpoint 43 for element 45 is determined, as well as the midpoint 53 for element 55. The distances from the focus element 12 to the elements 45 and 55 are then determined using the Pythagorean Theorem $(a^2+b^2=c^2)$. The horizontal and vertical distances between the focus element and the element in question form the two sides of a right triangle, and the point to point distance is the hypotenuse, which is defined as $\sqrt{(a^2+b^2)}$.

To determine the distance between the focus element 12 and the element in question 45, the browser determines the center point of the focus element 41 and the center point of the element in question 43. The vertical distance 44 is determined and then the horizontal distance 42, forming two sides of a right triangle 47. The distance line 40 from the center point 41 of the focus element 12 and the center point 43 of the element in question 45, forms the hypotenuse of the right triangle 47. The length of the hypotenuse line 40, and therefore, the distance between the two elements, can be determined with the Pythagorean Theorem, $a^2+b^2=c^2$ where a and b are the lengths of two sides of a right triangle, the vertical 44 and horizontal 42 distances in this case, and c is the length of the hypotenuse, the point-to-point distance 40 between the focus element 12 and the element in question 43. Therefore, the distance between the center points of the elements is the square root of the sum of the vertical distance 44 squared plus the horizontal distance 42 squared, or $\sqrt{(a^2+b^2)}$.

To determine the distance between the focus element 12 and the element in question 55, the system determines the center point of the focus element 41 and the center point of the element in question 53. The vertical distance 54 is determined and then the horizontal distance 52, forming two sides of a right triangle 57. The distance line 50 from the center point 41 of the focus element 12 and the center point 53 of the element in question 55, forms the hypotenuse of the right triangle 57. The length of the hypotenuse line 50, and therefore, the distance between the two elements, can be determined with the Pythagorean Theorem, $a^2+b^2=c^2$ where a and b are the lengths of two sides of a right triangle, the vertical 54 and horizontal 52 distances in this case, and c is the length of the hypotenuse, the point-to-point distance 50 between the focus element 12 midpoint 41 and the element in question 55 midpoint 53. Therefore, the distance between the center points of the elements is the square root of the sum of the vertical distance 54 squared plus the horizontal distance 52 squared, or $\sqrt{(a^2+b^2)}$.

Once calculated, it is determined that the distance to the midpoint 53 of element 55 is shorter than the distance to the midpoint 43 of element 45. Therefore, focus is transferred to element 55.

Figure 2:
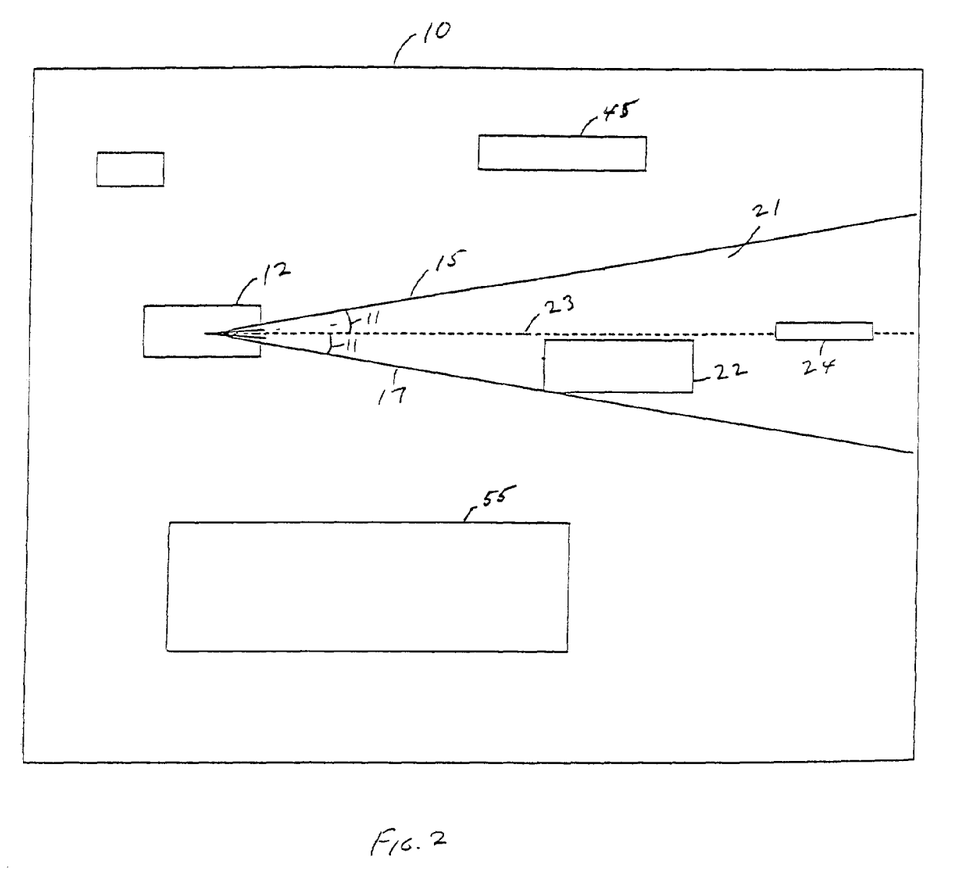
FIG. 2 depicts a GUI according to a second embodiment of the present invention.

FIG. 2 shows a second embodiment in accordance with the present invention where a multi-pass system is provided by defining an intermediate pass consisting of a cone 21 extending in the direction of the right arrow key. An upper line 15 and a lower line 17 are projected from the center of the focus element 12 at a predetermined angle 11 from the centerline 23 of the element 12 to form a cone 21. The selected element is the closest within the cone 21 on a point to point basis, or element 22 in this case. As with the first embodiment, points on the elements other than the center point can be used to determine the closest element and/or an absolute distance can be used instead of a point-to-point distance.

In the event that there was no element found within the search path(i.e., if element 22 and 24 are removed), the distances to element 45 and element 55 would be calculated in the manner discussed above with regard to FIG. 1 and it would be determined that element 55 is the next focus element.

Figure 3:
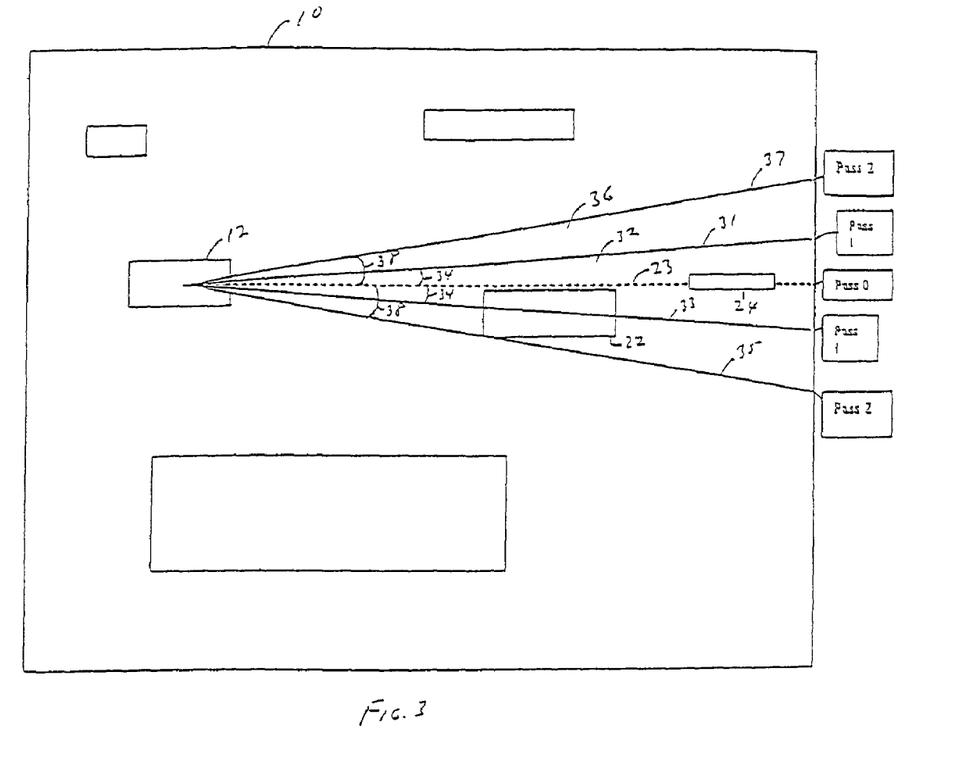
FIG. 3 depicts a GUI according to a third embodiment of the present invention.

In a third embodiment of the present invention shown in FIG. 3, a ray-trace method is used where a number of passes along expanding cones are scanned to find the closest element in the selected arrow key direction. The first pass (pass 0) scans along the centerline 23 of the focus element 12 in the direction of the selected arrow key, or the right arrow key in this case. The closest element along this line is chosen as the next focus element. Element 24 is the closest element along the centerline 23 and therefore, focus would be transferred to that element 24. If there were no element along the centerline 23, subsequent passes would be executed along incrementally increasing angles from the centerline 23 up to a maximum of ninety degrees. The next pass (pass 1) would scan within a cone 32 defined by an upper line 31 and a lower line 33 projected from the center of the focus element 12 at a predetermined angle 34 from the centerline 23. The closest element within the cone 32, element 22, would be selected as the next focus element. The distance between elements is calculated in the manner described above with regard to FIGS. 1 and 2. If there were no element within the cone 32, another pass (pass 2) would be executed along an incrementally larger cone 36 defined by an upper line 37 and a lower line 35 projected at a larger angle 38 from the centerline 23. In the event of a tie, where two elements are the same distance from the focus element, a convention is used, e.g., closest vertical/horizontal position.

In accordance with a further aspect of the invention, in the event that no element is found in the direction of the selected arrow key from the focus element to the end of the web page, the system will wrap around the page and begin scanning on the opposite side of the page, continuing across the page in the original direction. For example, when the focus element is in the middle of the page and the up arrow key is selected, if, after scanning the entire page from the focus element to the top of the page, there is no next closest element found, scanning wraps around the page and begins again at the bottom of the page toward the top.

Figure 4:
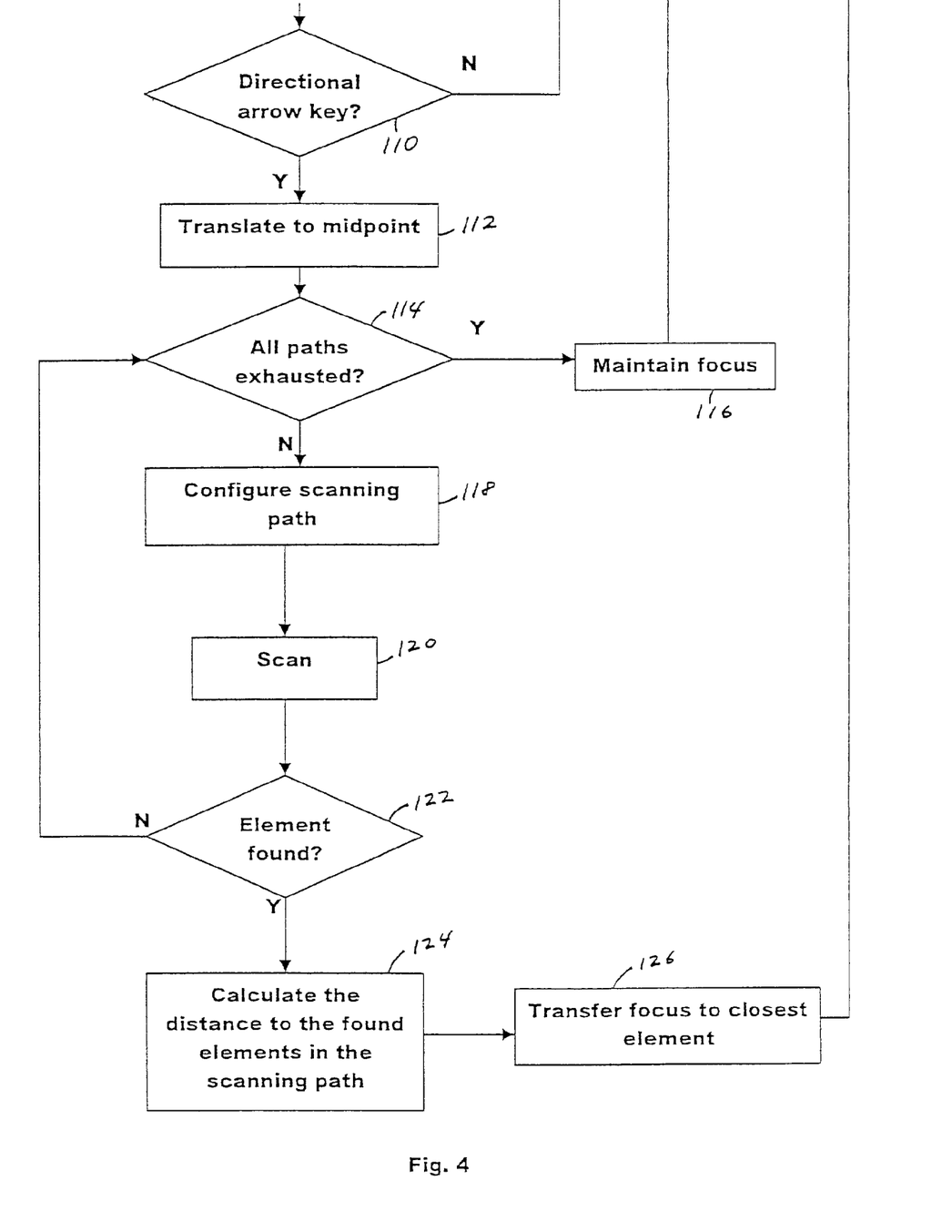
FIG. 4 depicts generic flowchart for directional focus management in accordance with the present invention.

Referring now to FIG. 4, there is shown a flowchart for a program implementing the present invention in locating and transferring focus to the next closest element. The program waits for a directional arrow key to be selected (step 110) and translates the starting position from which to search to the mid-point of the focus element (step 112). The program checks to see whether all search paths in the selected direction have already been searched (step 114). If they have, this indicates that there is no element in the selected direction and focus is maintained on the current element (step 116). The program may use a wraparound variable that is set, e.g., to 1, if the search for a next closest element has wrapped around the screen. In this regard, a set wrap around variable would indicate that all paths have been searched since the wraparound is the last search path used. If a wraparound scan has not produced any elements, it follows that there is none in the search direction. Alternatively, if a wraparound feature is not desired, the program can maintain focus on the focus element and terminate. The user will have to pick a new direction to transfer focus to another element.

The appropriate scanning path is configured (step 118) depending on the directional key selected and the particular embodiment being implemented. For example, selecting the right directional arrow in the first embodiment described above will result in a horizontal tunnel extending from the right side of the element to the end of the display screen for the scanning path. Selecting the up arrow key will create a vertical tunnel extending upwardly from the top of the element. In the second embodiment, where the scanning path is a cone, a horizontal and vertical cone will result, respectively.

Once the scanning path is configured, the contents of the path are scanned (step 120) for GUI elements in the path. Any GUI element with some part in the path will be selected as a possible element for the transfer of focus. If an element is not found (step 122), the program returns to check whether all paths in the searching direction have been exhausted (step 114). If they have not, a larger search path is configured (step 118) and scanned (step 120).

If an element or elements are found, their respective distances from the focus element are determined (step 124). The element with the smallest distance is identified and focus is transferred (step 126).

Again, the configuration of the larger search path is determined by the particular embodiment employed. In the first embodiment, the larger search path is everything in the search direction from the midpoint of the currently focused element to the end of the screen. The second embodiment uses the same larger search path. The ray-trace embodiment uses an incrementally larger cone search path which expands until it encompasses the GUI in the search direction from the element midpoint to the end of the screen. Detailed explanations for the functions of the steps taken by the main program are set out below.

Figure 4A:
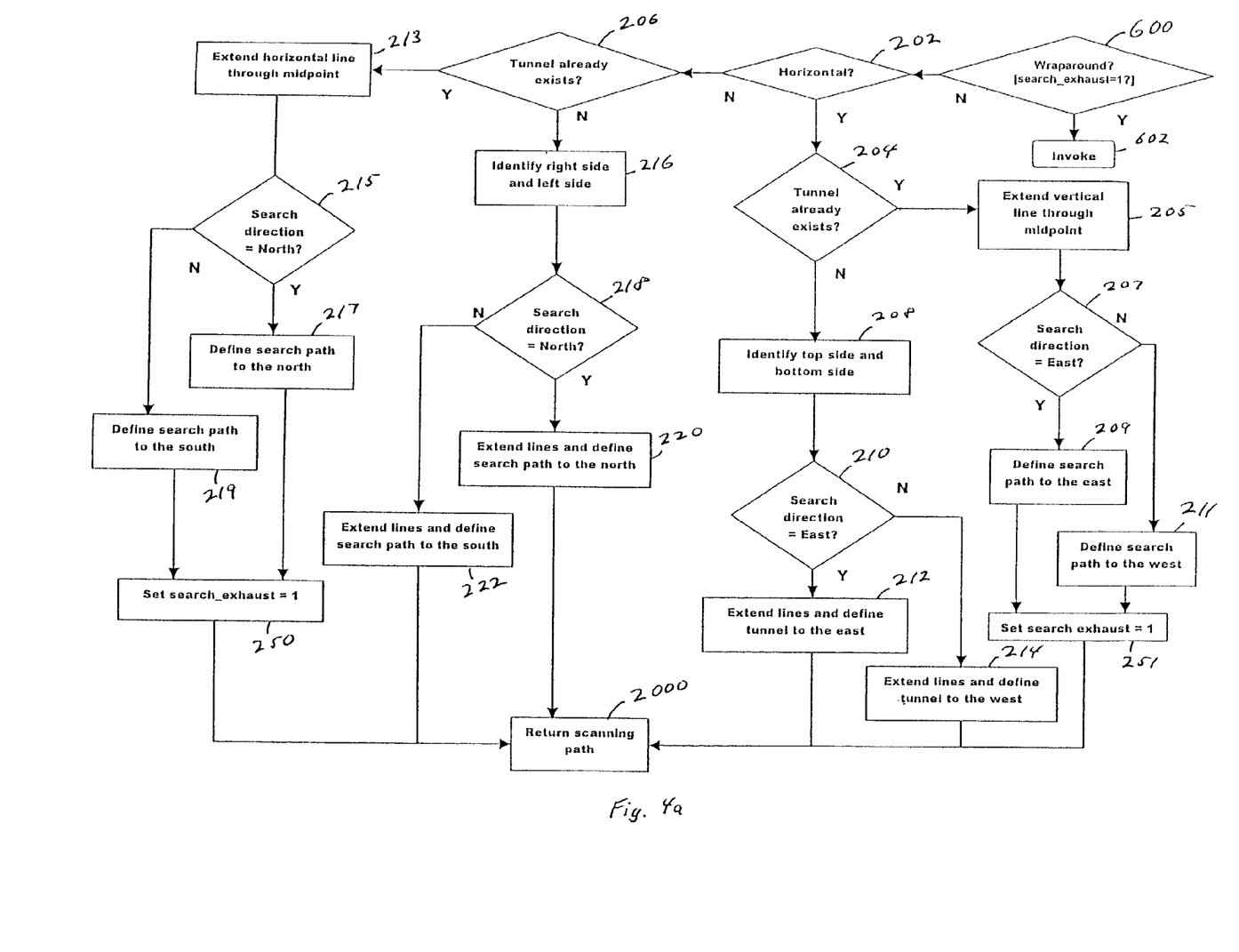
FIG. 4a depicts a flowchart for configuring a search path in accordance with a first embodiment of the present invention.

FIG. 4a depicts the process for configuring the search path in the first embodiment of the present invention for step 118 of FIG. 4.

First, the program checks whether scanning should be wrapped around the screen (step 600). This can be done by checking a search_exhaust variable that is set to 1 if all the search paths for the particular embodiment have been used so that wrapping around is *necessary*. I*f necessary*, a wraparound function is invoked (*step* 602). A*ssuming* a wraparound is not *necessary*, the function determines the general direction of the search *path*, whether it is horizontal or vertical (*step* 202). I*n* either *case*, the next step determines whether a tunnel has already been created and used for scanning (*steps* 204 and 206). I*f* the search direction is horizontal (*step* 202) and a tunnel does exist (*step* 204), it signifies a need for a larger search path because if the tunnel has already been used and if no next closest element has been *found*, it follows that there is no element in the *tunnel*. A larger search path is configured by extending a vertical line through the midpoint of the focus element (*step* 205) and then determining which direction is to be searched (*step* 207). I*f* the search direction is *east*, then the search path is defined as east of the vertical line (*step* 209). I*f* the search direction is to the *west*, then the search path is defined to the west of the line (*step* 211). A*fter* defining the final search *path*, the search_exhaust variable is set to 1 (step 251) to notify the main program that all search paths have been exhausted and the next scanning requires a wraparound.

If the search direction is horizontal, but a tunnel does not exist (step 204), the top and bottom sides of the focus element are identified to define the upper and lower edges of the tunnel (step 208). The search direction is determined (step 210) and lines are extended from the top and bottom sides of the focus element to the east (step 212) if the search direction is east, and to the west (step 214) if the search direction is west, thereby configuring the search path in the designated search direction.

If the search direction is vertical (step 202), the program queries whether a search tunnel exists (step 206). If it does exist, then a larger search path is configured and a horizontal line is extended through the focus element midpoint (step 213). The search direction is determined (step 215) and the search path is configured to the north of the line (step 217) or to the south of the line (step 219) in accordance with the search direction. Again, here the last search path has been configured so the search_exhaust variable is set to 1 (step 250).

If a search tunnel does not exist (step 206), it is created when the search direction is vertical by identifying the right and left sides of the focus element (step 216). Next, the search direction is determined (step 218) and the tunnel is created by extending lines from the right and left sides of the focus element to the north when the search direction is north (step 220), or by extending lines to the south when the search direction is south (step 222). At the end of each case, the configured search path is returned to the main program for scanning (step 2000).

Figure 4B:
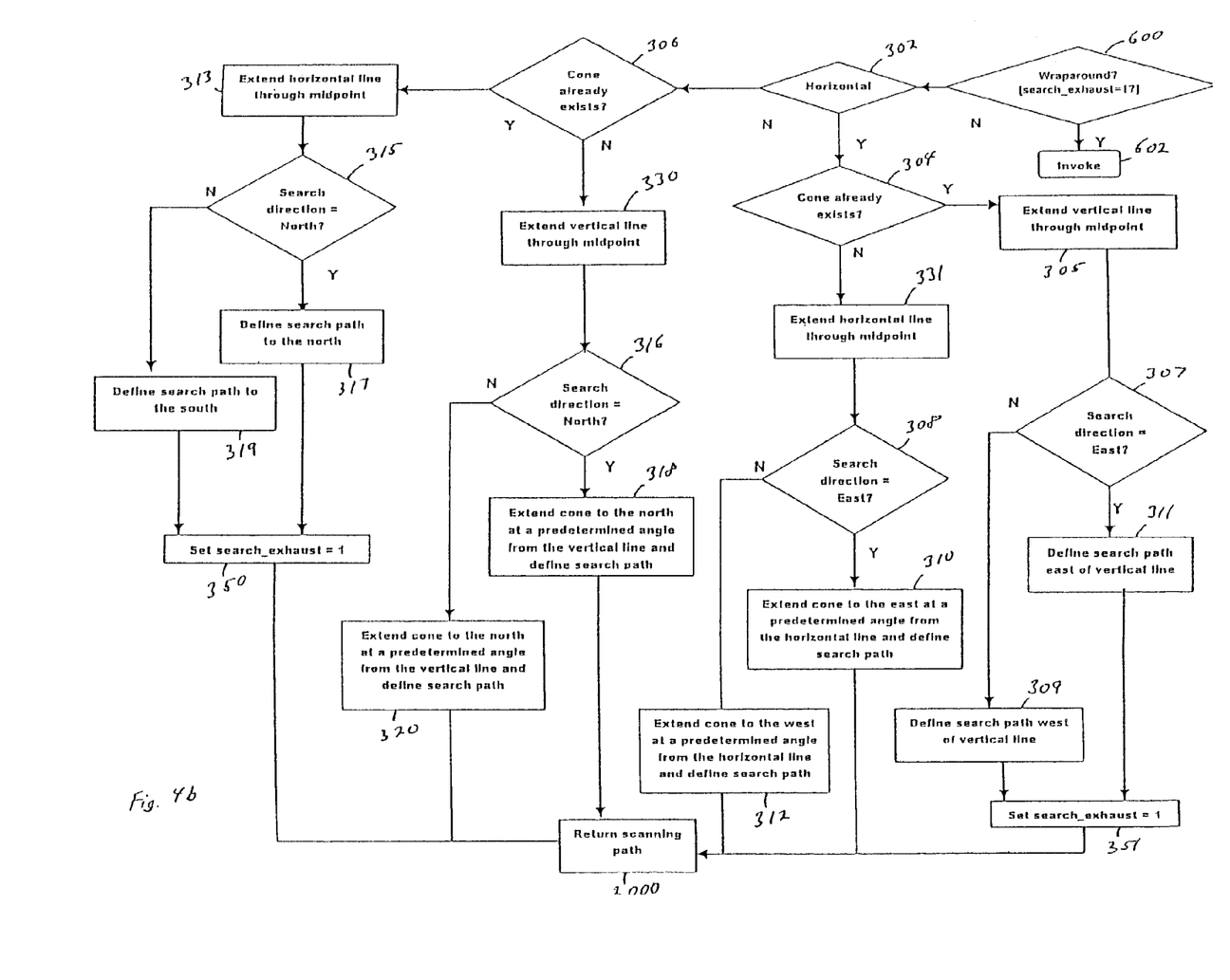
FIG. 4b depicts a flowchart for configuring a search path in accordance with a second embodiment of the present invention.
Figure 4C:
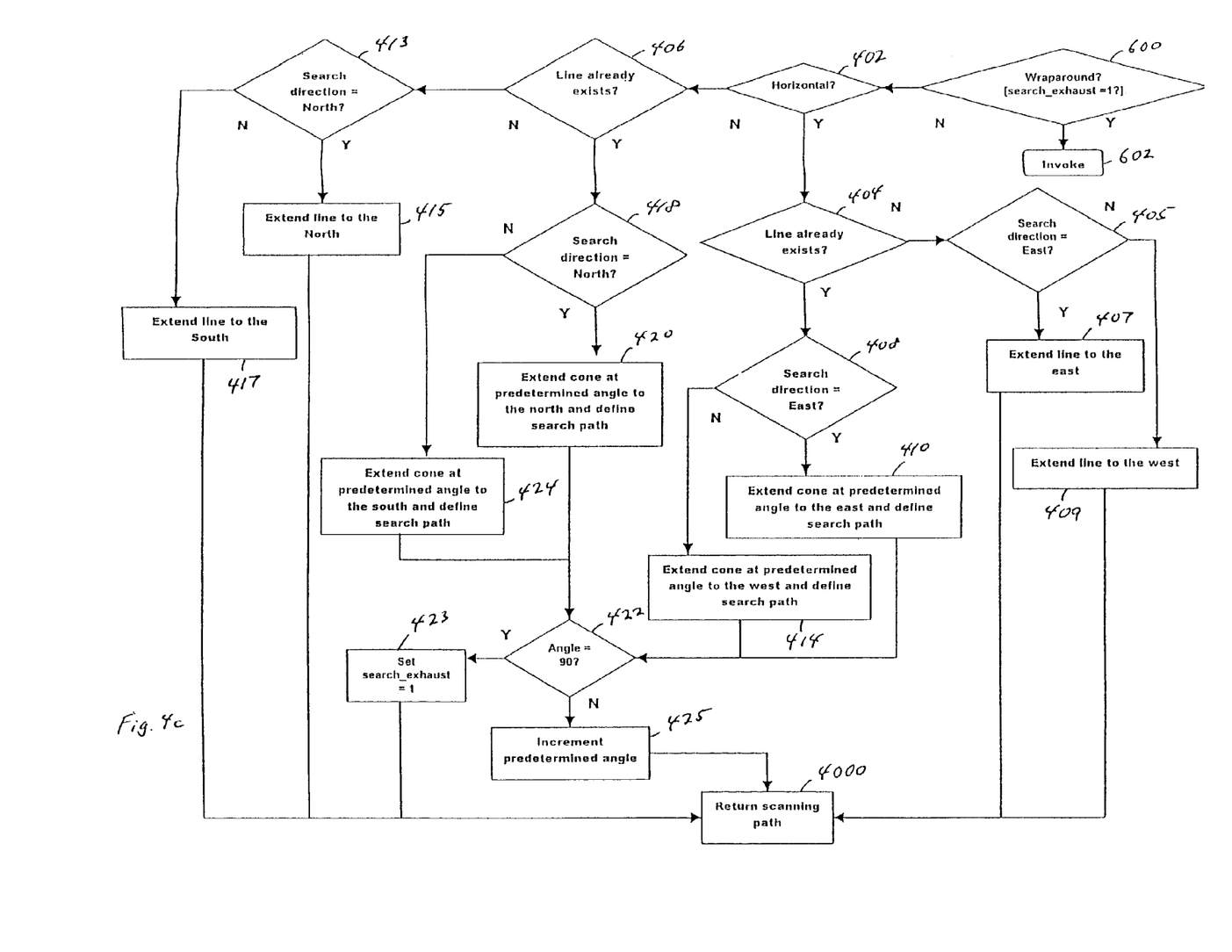
FIG. 4c depicts a flowchart for configuring a search path in accordance with a third embodiment of the present invention.

A flowchart for the second embodiment is shown in FIG. 4*b* and operates in a similar fashion to the flow chart of FIG. 4(*c*), with a cone being substituted for the tunnel.

Again, the program first checks if a wraparound is required (step 600) and invokes the wraparound function if it is (step 602). Assuming a wraparound is not necessary, the alignment of the search path is ascertained, whether it is horizontal or vertical (step 302). In either case, the next step determines whether a cone has already been created and used for scanning (steps 304 and 306). If the search direction is horizontal (step 302) and a cone does exist (step 304), this indicates that the cone was already used as a search path and a larger search path is needed. Therefore, a larger path is configured by extending a vertical line through the midpoint of the focus element (step 305) and then determining which direction is to be searched (step 307). If the search direction is east, then the search path is defined as east of the vertical line (step 311). If the search direction is to the west, then the search path is defined to the west of the line (step 309). Because the last search path has been defined, the search_exhaust variable is set to 1.

If the search direction is horizontal, but a cone does not exist (step 304), a cone is configured as follows. A horizontal line is extended through the midpoint of the focus element (step 331) and the search direction is determined (step 308). If the search direction is east, a cone is configured to the east by extending two lines from the focus element midpoint, at a predetermined angle from the horizontal line to define the search path (step 310). For west, the same is done in the opposite direction (step 312).

If the search direction is vertical (step 302), and a cone does not exist (step 306), one is created in a similar fashion in the search direction by extending a vertical line (step 330), determining if the search direction is north or south (step 316), and then extending a cone in the appropriate direction (steps 318 and 320).

If the program is searching in a vertical direction and a cone does already exist (step 316), then a larger search path is configured by extending a horizontal line through the element's midpoint (step 312), determining whether the search direction is north or south (step 315), and then configuring the search path for south of the horizontal line (step 319) or north of the horizontal line (step 317) in accordance with the search direction. After defining the last search path, the search_exhaust variable is set to 1.

Once the search path is defined, it is returned to the main program for scanning (step 3000).

Referring to FIG. 4*c*, there is shown a flowchart for the ray-trace embodiment which uses a multi-pass algorithm with a series of expanding cones.

After determining the wraparound function is not necessary (step 600), the alignment of the search direction is determined (step 402) and the program looks for the presence of a search line. As previously mentioned, the first pass in this embodiment comprises a line extending from the center of the focus element in the search direction.

As with the other embodiments, alignment of the search direction is determined (step 402). If the search direction is horizontal, and the center line does not exist, the search direction is determined (step 405) and the line extended to the east (step 407) or west (step 409), as appropriate from the focus element's center.

If the line does already exist (step 404), the search direction is determined (step 408). If the search direction is east, two lines are extended from the centerline at a certain angle to configure a cone and define the search path to the east (step 410). The predetermined angle is checked to see whether it has been incremented to 90 degrees (step 422), which is the upper limit on the cone because a greater angle from the centerline of the element would cause a scan opposite the search direction. If the angle is 90 degrees (step 422), then the search_exhaust variable is set to 1 (step 423) before returning the search path (step 4000). If the predetermined angle has not reached 90 degrees, then it is incremented by a predetermined angular increment (step 425) before returning the scanning path to the main program.

The same steps are performed in the western direction if the search direction is west (steps 414 and 422).

For a vertical search, the process proceeds from steps 402 to 406. If a center line is not present, the search direction is ascertained (step 413) and the line created to the north (step 415) or the south (step 417). If the center line is present, the search direction is determined (step 418), a cone with lines a predetermined angle from the centerline is extended in the appropriate direction (steps 420 and 424), and the predetermined angle is checked to ensure it has not exceeded 90 degrees (step 422), so that the angle may be incremented (step 425) if the angle is below 90, or so that the search_exhaust variable can be set to 1 (step 423) if the angel is equal to 90. The resulting search path is returned to the main program for scanning (step 4000). It should be noted that the first time the process implements steps 420, 424, 410 and 414, the predetermined angle is 0 degrees.

In any event, referring back to FIG. 4, if elements are found (step 122), then the distance to each of the elements is calculated (step 124), the closest element is selected, and focus is transferred to that element (step 126).

Figure 4D:
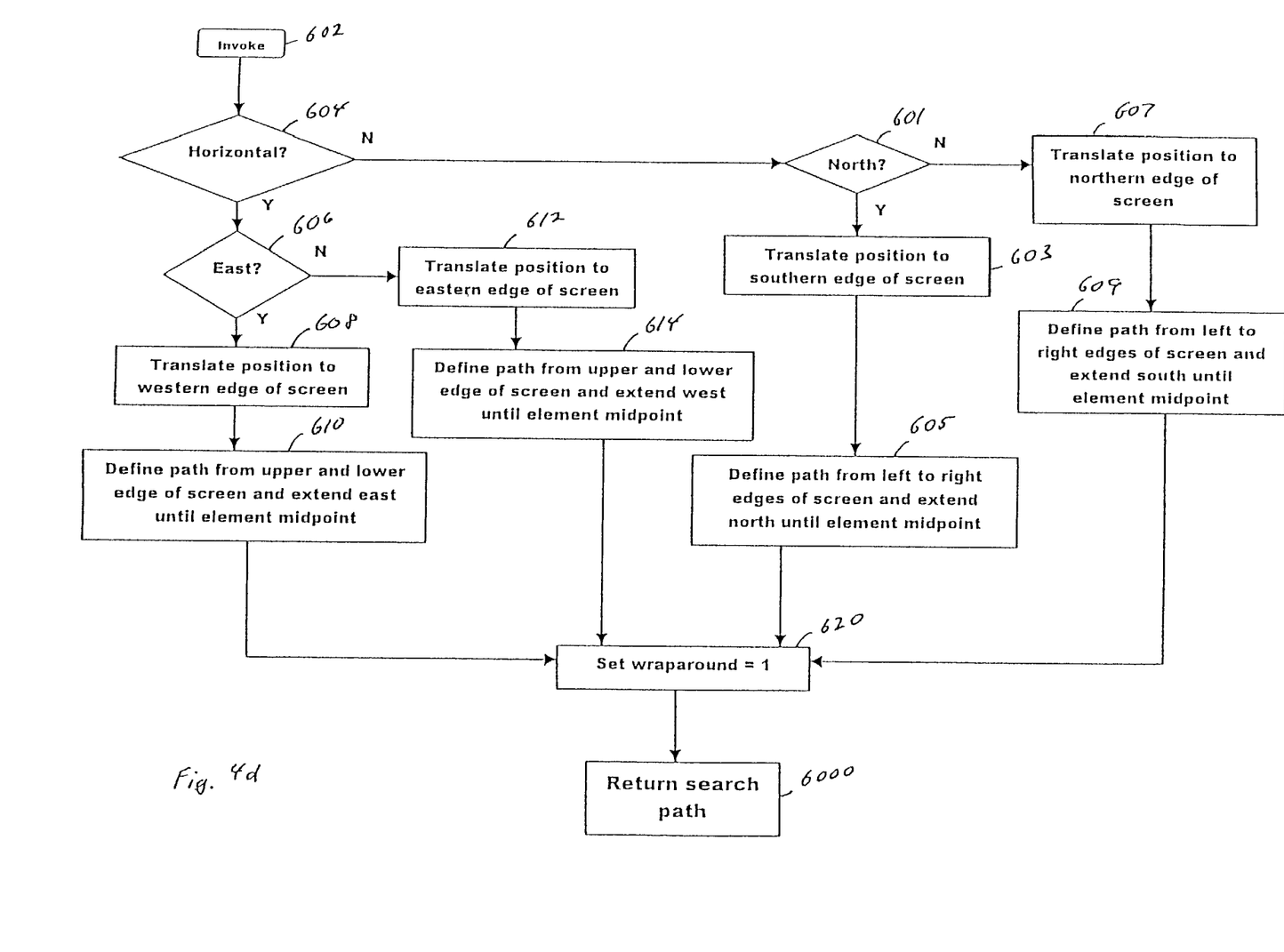
FIG. 4d depicts a flowchart for a wraparound function according to a further embodiment the present invention.

In the event that all passes of a scan in one direction do not find an element in that direction, a wraparound algorithm can be used. The flowchart for the wraparound function, which is invoked when search_exhaust=1, is shown in FIG. 4*d*.

When the wraparound function is invoked (step 602), the function determines the alignment of the search direction (step 604). If the alignment is horizontal, the function determines if the search direction is east or west (step 606). If the direction is east, the starting position of the search is translated to the western edge of the screen (step 608), the edge of the screen opposite the east edge, where the scanning stopped. The search path is defined by the upper and lower edges of the screen and continues east until the midpoint of the element (step 610). The same is done toward the west, i.e., starting position is translated to the eastern edge of the screen (step 612), and the search path is defined by the upper and lower screen edges and extends west to the midpoint of the element (step 614).

If the search direction alignment is vertical (step 604), the function determines whether the search direction is north or south (step 601). If the search direction is north, the starting position is translated to the opposite screen edge, the southern edge (step 603) and the search path is defined by the left and right edges, and extends north until the midpoint of the element (step 605). When the search direction is south, the starting position for scanning is translated to the northern screen edge (step 607) and the search path is defined by the left and right edges of the screen and extends south to the element midpoint (step 609).

After defining the wraparound search path, the wraparound variable is set to 1 (step 620) to indicate that a wraparound scanning has occurred.

Figure 4E:
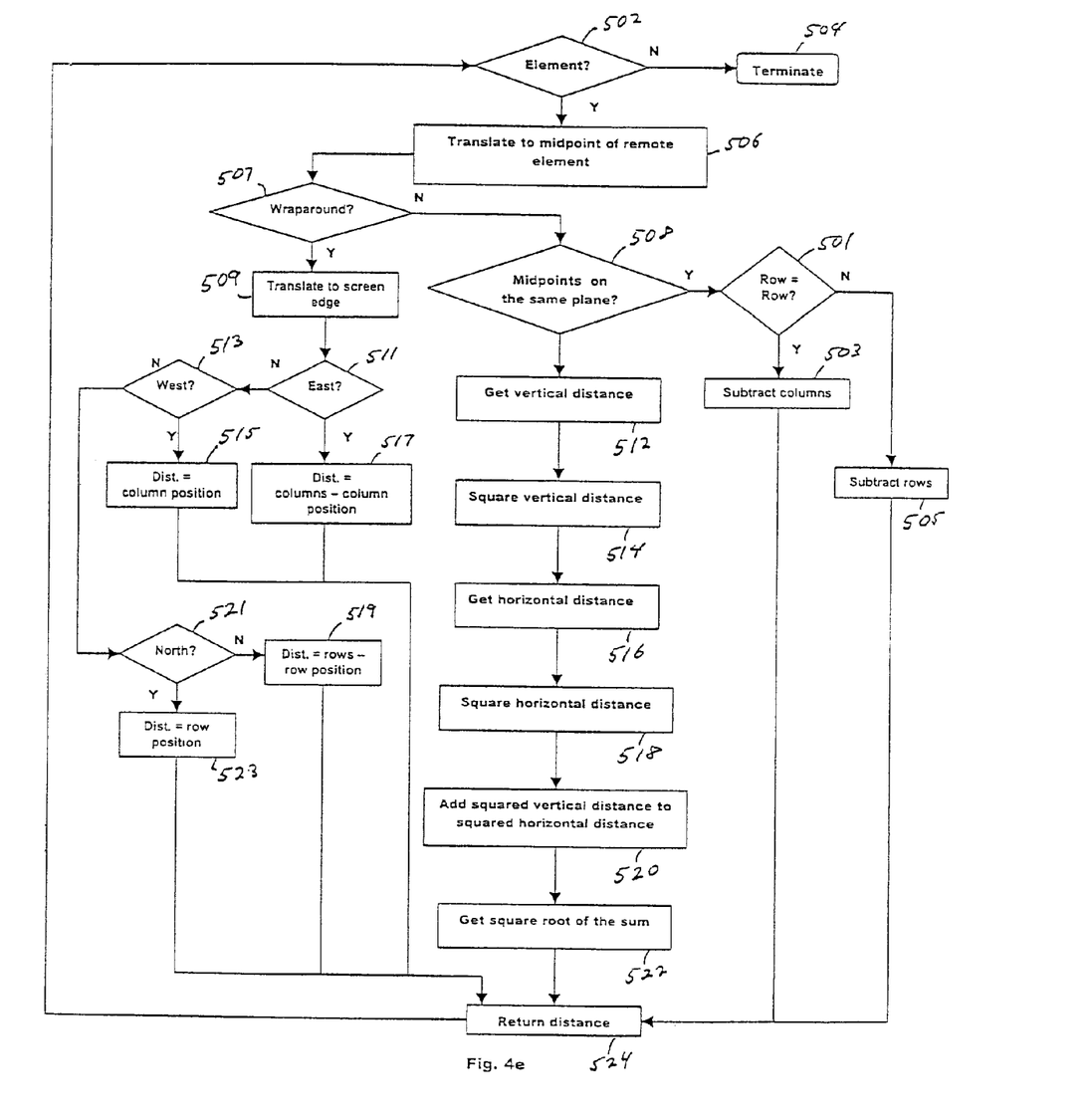
FIG. 4e depicts a flowchart for calculating a distance between GUI elements.

FIG. 4e depicts a flowchart for a process that may be used to determine the distance to each of the elements found while scanning the search path. In the flowchart of FIG. 4(e), the distance to an element within a tunnel or cone search path is calculated as an absolute distance, whereas the distance to an element outside a tunnel or cone search path is calculated as a point to point distance.

A computer display is broken down into a grid of rows and columns with the intersection of a particular row and a particular column corresponding to a point on the screen. To find horizontal distance between two points, the difference in column position is determined. For vertical distance, the row positions of the two points are subtracted.

When the process of FIG. 4e is invoked in step 124 of FIG. 4, the main program will have a number of remote elements whose respective distances from the focus element have to be determined to find the next closest element. The process will determine the distance of each one and return that distance to the main program. If there are no element distances left to determine (step 502), the process terminates (step 504). If there is a remote element whose distance from the focus element must be determined, the midpoint of the remote element is determined (step 506). Next, the function determines whether the found elements were the result of a wraparound scan (step 505) because in that case, the next closest element is the element closest to the edge from which the wrap around scan started, as opposed to any point to point distance calculation. This determination can be made by checking the wrap around variable previously mentioned. A "1" value represents true, indicating that a wraparound has occurred.

If a wraparound has not occurred, a determination is made whether the remote element is in the tunnel (for FIG. 4b) or cone (FIG. 4c) (step 508). If so, the distance may be ascertained as follows. If the search direction is horizontal (step 501), then it follows that the distance between the elements is a difference in column position. Therefore, the column positions of each midpoint are subtracted (step 503) to obtain the horizontal distance between them, which is returned to the main program (step 524) and the function checks to see if there are other element distances to determine (step 502).

If the search direction is vertically aligned (step 501) then the distance between the elements lies in the vertical direction. Therefore, the difference between their respective row positions is determined by subtraction (step 505). The distance is returned (step 524) and the function checks to see if there are any other element distances to determine (step 502).

If, however, the points are not in the original search tunnel or cone, (step 508), the point-to-point distance between the midpoint of the focus element and the remote element is determined using the Pythagorean Theorem as previously discussed.

The vertical distance is obtained (step 512) by subtracting the row of the focus midpoint from the row of the remote midpoint, and then squared (step 514). Horizontal distance is determined by subtracting column positions (step 516) and squared (step 518). The squares of the horizontal and vertical distances are added (step 520) and it's square root obtained (step 522). This square root is equal to the diagonal point-to-point distance between the elements. The distance is returned to the main program (step 524) and the program returns to check whether there are any more element distances to calculate (step 502). It should be noted that the same process could be used to determine a point-to-point distance within a cone or tunnel search path.

If the found elements are the results of a wraparound (step 505), then the position for calculating distance is changed from the focus element midpoint to the edge of the screen from which the wraparound began. A variable, wraparound_direction, which is a product of the wraparound function, can be referenced to easily determine the direction and the corresponding screen edge from which the wraparound originated. The starting edge for determining distance is the opposite of the search direction. For example, a wraparound-direction of east indicates that the wraparound search started at the west end of the display screen. A direction of north indicates the south edge was the starting point. Once determined, the starting position is translated to the appropriate edge (step 507).

If the starting edge is east (step 509), the distance from the east edge of the screen equals the total number of columns minus the column position of the remote element because columns are counted from left to right on the screen.

If the starting edge is west (step 509), then the distance from the west edge is simply the remote midpoint column position because the column position at the west edge of the screen is zero as columns are counted from the left to the right edge of the screen.

If the starting edge is not west (step 513), the function determines if it is north (step 517). If the starting edge was north, then the distance to the remote element midpoint is merely the midpoint's row position because the row at the north edge of the screen is zero and rows are counted from the top to the bottom of the screen.

If the starting edge is not north (step 517), then it is south since all other directions have been checked. In this case, the distance from the south edge of the screen is equal to the total number of rows minus the remote midpoint row position.

Once the distance is calculated, it is returned to the main program (step 524) and the function looks to see if there are anymore element distances to calculate (step 502). If there are none, and all the distances to all the found elements have been calculated, the function terminates (step 504).

Although the present invention has been described above with regard to a two dimensional screen display with two dimensional tunnel and cone search paths, the present invention is also applicable to "virtual reality" applications wherein the GUI is displayed in three dimensions. In such a three dimensional embodiment, a three dimensional tunnel or cone can be used to define the search path.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for navigating a GUI web page in a browser comprising the steps of:
   selecting a focus element;
   determining a search direction;
   defining a search tunnel in the search direction starting at the focus element,
   scanning the search tunnel for a next closest GUI element to the focus element,
   wherein, if the step of scanning the search tunnel for the next closest element produces one element, said one element is the next closest element;
   wherein, if the step of scanning the search tunnel for the next closest element produces a plurality of elements, the method further comprises the steps of:
      determining a horizontal distance from the focus element to each of the plurality of elements;
      determining a vertical distance from the focus element to each of the plurality of elements;
      determining a distance from a center of the focus element to a center of each of the plurality of elements by calculating a square root of the sum of the vertical distance squared and the horizontal distance squared;
      selecting a closest element from the plurality of elements as the next closest element, the closest element having the smallest distance;
      transferring focus to the next closest element.

2. The method of claim 1 further comprising:
   defining a larger search path when the next closest element is not found in the search tunnel;
   scanning the larger search path for the next closest element;
   transferring focus to the next closest element.

3. The method of claim 1 wherein the determining step further comprises selecting a
   directional arrow key on a keyboard.

4. The method of claim 1 wherein the defining step further comprises extending a line from an upper end and a lower end of a GUI element in the search direction to define a horizontal tunnel.

5. The method of claim 1 wherein the defining step further comprises extending a line from a left side and a right side of a GUI element in the search direction to define a vertical tunnel.

6. The method of claim 1 wherein the GUI is a virtual reality interface and the search tunnel is three-dimensional.

7. The method of claim 1, wherein the tunnel is two dimensional.

8. A web browser navigation system comprising:
   a processor; and,
   a data storage device operably connected to the processor, the data storage device including a program executable by the processor to:
      select a focus element;
      determine a search direction;
      define a search tunnel along the search direction;
      scan the search tunnel for a next closest GUI element to the focus element,
      wherein, if scanning the search tunnel for the next closest element produces one element, said one element is the next closest element;
      wherein, if scanning the search tunnel for the next closest element produces one elements, said one element is the next closet element;
      wherein if scanning the search tunnel for the next closest elements produces a plurality of elements, the program is executable by the processor to:
         determine a horizontal distance from the focus element to each of the plurality of elements;
         determine a vertical distance from the focus element to each of the plurality of elements;
         determine a distance from a center of the focus element to a center of each of the plurality of elements by calculating a square root of a sum of the vertical distance squared and the horizontal distance squared;
         select a closest element from the plurality of elements as the next closest element, the closest element having the smallest distance;
         transfer focus to the next closest element.

9. The system of claim 8 wherein the program is further executable to:
   define a larger search path when the next closest element is not found in the search path;
   scan the larger search path for the next closest element;
   transfer focus to the next closest element.

10. The system of claim 8 wherein the determining step further comprises selecting a
    directional arrow key on a keyboard.

11. The system of claim 8 wherein the defining step further comprises extending a line from an upper end and a lower end of a GUI element in the search direction to define a horizontal tunnel.

12. The system of claim 8 wherein the defining step further comprises extending a line from a left side and a right side of a GUI element in the search direction to define a vertical tunnel.

13. The system of claim 8 wherein the GUI is a virtual reality interface and the search tunnel is three-dimensional.

14. The system of claim 8, wherein the tunnel is two dimensional.

15. A computer readable medium, having stored thereon, computer executable process steps operative to control a computer to navigate a web page in a browser, the process steps comprising:
    selecting a focus element;
    determining a search direction;
    defining a search tunnel along the search direction;
    scanning the search tunnel for a next closest GUI element to the focus element;
    wherein, if the step of scanning the search tunnel for the next closest element produces one element, said one element is the next closest element;
    wherein, if the step of scanning the search tunnel for the next closest element produces a plurality of elements, the method further comprises the steps of:
       determining a horizontal distance from the focus element to each of the plurality of elements;
       determining a vertical distance from the focus element to each of the plurality of elements;
       determining a distance from a center of the focus element to a center of each of the plurality of elements by calculating a square root of the sum of the vertical distance squared and the horizontal distance squared;
       selecting a closest element from the plurality of elements as the next closest element, the closest element having the smallest distance;
       transferring focus to the next closest element.

16. The computer readable medium of claim 15 further comprising:
defining a larger search path when the next closest element is not found in the search path;
scanning the larger search path for the next closest element;
transferring focus to the next closest element.

17. The computer readable medium of claim 15 wherein the determining step further comprises selecting a directional arrow key on a keyboard.

18. The computer readable medium of claim 15 wherein the defining step further comprises extending a line from an upper end and a lower end of a GUI element in the search direction to define a tunnel.

19. The computer readable medium of claim 15 wherein the defining step further comprises extending a line from a left side and a right side of a GUI element in the search direction to define a tunnel.

20. The computer readable medium of claim 15 wherein the GUI is a virtual reality interface and the search tunnel is three-dimensional.

21. The computer readable medium of claim 15, wherein the tunnel is two dimensional.

22. A method for navigating a GUI web page in a browser comprising the steps of:
selecting a focus element;
determining a search direction;
defining a search cone in the search direction starting at a midpoint of the focus element, the search cone defined by a pair of lines extending from the midpoint at a predetermined angle;
scanning the search cone for a next closest GUI element to the focus element
wherein, if the step of scanning the search cone for the next closest element produces one element, said one element is the next closest element;
wherein, if the step of scanning the search cone for the next closest element produces a plurality of elements, the method further comprises the steps of:
determining a horizontal distance from the focus element to each of the plurality of elements;
determining a vertical distance from the focus element to each of the plurality of elements;
determining a distance from a center of the focus element to a center of each of the plurality of elements by calculating a square root of the sum of the vertical distance squared and the horizontal distance squared;
selecting a closest element from the plurality of elements as the next closest element, the closest element having the smallest distance;
transferring focus to the next closest element.

23. The method of claim 22 further comprising:
defining a larger search path when the next closest element is not found in the search cone;
scanning the larger search path for the next closest element;
transferring focus to the next closest element.

24. The method of claim 22 wherein the determining step further comprises selecting a directional arrow key on a keyboard.

25. The method of claim 22 wherein the GUI is a virtual reality interface and the search cone is three-dimensional.

26. The method of claim 22, wherein the cone is two dimensional.

27. A web browser navigation system comprising:
a processor; and,
a data storage device operably connected to the processor, the data storage device including a program executable by the processor to:
select a focus element;
determine a search direction;
define a search cone in the search direction starting at a midpoint of the focus element, the search cone and defined by a pair of lines extending from the midpoint at a predetermined angle;
scan the search cone for a next closest GUI element to the focus element,
wherein, if scanning the search cone for the next closest element produces one element, said one element is the next closest element;
wherein if scanning the search cone for the next closest element produces a plurality of elements, the program is executable by the processor to:
determine a horizontal distance from the focus element to each of the plurality of elements;
determine a vertical distance from the focus element to each of the plurality of elements;
determine a distance from a center of the focus element to a center of each of the plurality of elements by calculating a square root of a sum of the vertical distance squared and the horizontal distance squared;
select a closest element from the plurality of elements as the next closest element, the closest element having the smallest distance;
transfer focus to the next closest element.

28. The system of claim 27 wherein the program is further executable to:
define a larger search path when the next closest element is not found in the search path;
scan the larger search path for the next closest element;
transfer focus to the next closest element.

29. The system of claim 27 wherein the determining step further comprises selecting a
directional arrow key on a keyboard.

30. The system of claim 27, wherein the search cone is a three dimensional search cone.

31. The system of claim 27, wherein the cone is two is two dimensional.

32. A computer readable medium, having stored thereon, computer executable process steps operative to control a computer to navigate a web page in a browser, the process steps comprising:
selecting a focus element;
determining a search direction;
defining a search cone in the search direction starting at a midpoint of the focus element, the search cone defined by a pair of lines extending from the midpoint at a predetermined angle;
scanning the search cone for a next closest GUI element to the focus element;
wherein, if the step of scanning the search cone for the next closest element produces one element, said one element is the next closest element;
wherein, if the step of scanning the search cone for the next closest element produces a plurality of elements, the method further comprises the steps of:
determining a horizontal distance from the focus element to each of the plurality of elements;
determining a vertical distance from the focus element to each of the plurality of elements;

determining a distance from a center of the focus element to a center of each of the plurality of elements by calculating a square root of the sum of the vertical distance squared and the horizontal distance squared;

selecting a closest element from the plurality of elements as the next closest element, the closest element having the smallest distance;

transferring focus to the next closest element.

33. The computer readable medium of claim 32 further comprising:

defining a larger search path when the next closest element is not found in the search path;

scanning the larger search path for the next closest element;

transferring focus to the next closest element.

34. The computer readable medium of claim 32 wherein the determining step further comprises selecting a directional arrow key on a keyboard.

35. The computer readable medium of claim 32 wherein the GUI is a virtual reality interface and the search cone is three-dimensional.

36. The computer readable medium of claim 32, wherein the cone is two dimensional.

37. A method for navigating a GUI web page in a browser comprising the steps of:

(a) selecting a focus element;
(b) determining a search direction;
(c) defining a search line in the search direction starting at a midpoint of the focus element;
(d) scanning the search line for a next closest GUI element to the focus element;
(e) if the next closest element is found, transferring focus to the next closest element;
(f) defining a larger search path when the next closest element is not found in the search line, the larger search path further comprising a cone defined by a pair of lines extending from the midpoint at a predetermined angle from the search line;
(g) scanning the larger search path for the next closest element;
(h) if the next closest element is found, transferring focus to the next closest element;
(i) if the next closest element is not found in the larger search path, increase the predetermined angle and repeat steps (f) through (i).

38. The method of claim 37, wherein the cone is two dimensional.

39. The method of claim 37 wherein the GUI is a virtual reality interface and the cone is three dimensional.

40. The method of claim 37 wherein the determining step further comprises selecting a directional arrow key on a keyboard.

41. The method of claim 37 wherein the step of scanning the search path for the next closest element produces a plurality of elements and further comprises the steps of:

determining a horizontal distance from the focus element to each of the plurality of elements;

determining a vertical distance from the focus element to each of the plurality of elements;

determining a distance from the center of the focus element to the center of each of the plurality of elements by calculating the square root of the sum of the vertical distance squared and the horizontal distance squared;

selecting a closest element from the plurality of elements, the closest element having the smallest distance.

42. A web browser navigation system comprising:

a processor; and, a data storage device operably connected to the processor, the data storage device including a program executable by the processor to:

(a) select a focus element;
(b) determine a search direction;
(c) defining a search line in the search direction starting at a midpoint of the focus element;
(d) scan the search line for a next closest GUI element to the focus element;
(e) if the next closest element is found, transfer focus to the next closest element;
(f) if the next closest element is found, define a larger search path comprising a cone defined by lines extending from the midpoint at a predetermined angle from the search line;
(g) scan the larger search path for the next closest element;
(h) if the next closes element is found, transfer focus to the next closest element;
(i) if the next closest element is found in the larger search path, increase the predetermined angle and repeat (f) through (i).

43. The system is claim 42, wherein the cone is two dimensional.

44. The system of claim 42 wherein the GUI is a virtual reality interface and the cone is three dimensional.

45. The system of claim 42 wherein the determining step further comprises selecting a directional arrow key on a keyboard.

46. The system of claim 42 wherein the step of scanning the search path for the next closest element produces a plurality of elements and further comprises the steps of:

determining a horizontal distance from the focus element to each of the plurality of elements;

determining a vertical distance from the focus element to each of the plurality of elements;

determining a distance from the center of the focus element to the center of each of the plurality of elements by calculating the square root of the sum of the vertical distance squared and the horizontal distance squared;

selecting a closest element from the plurality of elements, the closest element having the smallest distance.

47. A computer readable medium, having stored thereon, computer executable process steps operative to control a computer to navigate a web page in a browser, the process steps comprising:

(a) selecting a focus element;
(b) determining a search direction;
(c) defining a search line in the search direction starting at a midpoint of the focus element;
(d) scanning the search line for a next closest GUI element to the focus element;
(e) if the next closest element is found, transferring focus to the next closest element;
(f) defining a larger search path when the next closest element is not found in the search line, the larger search path further comprising a cone defined by lines extending from the midpoint at a predetermined angle from the search line;
(g) scanning the larger search path for the next closest element;
(h) if the next closest element is found, transferring focus to the next closest element;

(i) if the next closest element is not found in step (h), increasing the predetermined angle and repeating step (f) through (i).

48. The computer readable medium of claim 47, wherein the cone is two dimensional.

49. The computer readable medium of claim 47 wherein the GUI is a virtual reality interface and the cone is three dimensional.

50. The computer readable medium of claim 47 wherein the determining step further comprises selecting a directional arrow key on a keyboard.

51. The computer readable medium of claim 47 wherein the step of scanning the search path for the next closest element produces a plurality of elements and further comprises the steps of:

determining a horizontal distance from the focus element to each of the plurality of elements;

determining a vertical distance from the focus element to each of the plurality of elements;

determining a distance from the center of the focus element to the center of each of the plurality of elements by calculating the square root of the sum of the vertical distance squared and the horizontal distance squared;

selecting a closest element from the plurality of elements, the closest element having the smallest distance.

* * * * *